United States Patent
Taguchi et al.

(10) Patent No.: US 11,505,693 B1
(45) Date of Patent: Nov. 22, 2022

(54) THERMOPLASTIC RESIN COMPOSITION AND MOLDED ARTICLE PRODUCED BY MOLDING THE SAME

(71) Applicant: TECHNO-UMG CO., LTD., Tokyo (JP)

(72) Inventors: Yuuki Taguchi, Tokyo (JP); Yoshitaka Naitoh, Tokyo (JP)

(73) Assignee: TECHNO-UMG CO., LTD., Tokyo (JP)

( * ) Notice: Subject to any disclaimer, the term of this patent is extended or adjusted under 35 U.S.C. 154(b) by 0 days.

(21) Appl. No.: 17/765,133

(22) PCT Filed: Jul. 29, 2021

(86) PCT No.: PCT/JP2021/028127
§ 371 (c)(1),
(2) Date: Mar. 30, 2022

(87) PCT Pub. No.: WO2022/038987
PCT Pub. Date: Feb. 24, 2022

(30) Foreign Application Priority Data

Aug. 21, 2020 (JP) .................. 2020-140254

(51) Int. Cl.
*C08L 33/12* (2006.01)
*C08L 25/18* (2006.01)
*C08L 51/04* (2006.01)

(52) U.S. Cl.
CPC .............. *C08L 33/12* (2013.01); *C08L 25/18* (2013.01); *C08L 51/04* (2013.01); *C08L 2203/30* (2013.01); *C08L 2205/025* (2013.01); *C08L 2205/03* (2013.01)

(58) Field of Classification Search
CPC ................. C08L 51/04; C08L 25/18
See application file for complete search history.

(56) References Cited

U.S. PATENT DOCUMENTS

2020/0216656 A1* 7/2020 Brown ................ C08F 2/38

FOREIGN PATENT DOCUMENTS

| JP | 2005-132970 A | 5/2005 |
| JP | 2015-093910 A | 5/2015 |
| JP | 2019-099698 A | 6/2019 |
| JP | 2019-137751 A | 8/2019 |
| JP | 2019-151697 A | 9/2019 |
| WO | 2019/082715 A1 | 5/2019 |
| WO | 2020-095622 A1 | 5/2020 |

OTHER PUBLICATIONS

PCT/ISA/210, "International Search Report for International Application No. PCT/JP2021/028127," dated Sep. 14, 2021.

* cited by examiner

*Primary Examiner* — Jeffrey C Mullis
(74) *Attorney, Agent, or Firm* — Manabu Kanesaka

(57) ABSTRACT

A thermoplastic resin composition including a graft copolymer (B) produced by graft polymerization of a vinyl monomer mixture (m1) including an alkyl (meth)acrylate ester, a vinyl cyanide compound, and an aromatic vinyl compound onto a copolymer (A) produced by copolymerizing an alkyl (meth)acrylate ester (a) and a (meth)acrylate ester (b) including an aromatic hydrocarbon group at a specific ratio and a copolymer (C) that is a product of a polymerization reaction of a vinyl monomer mixture (m2) including an alkyl (meth)acrylate ester. The graft copolymer (B) includes at least a graft copolymer (B) having a specific volume-average particle size. The copolymer (A) has a specific volume-average particle size and a specific particle size distribution.

6 Claims, No Drawings

THERMOPLASTIC RESIN COMPOSITION AND MOLDED ARTICLE PRODUCED BY MOLDING THE SAME

TECHNICAL FIELD

The present invention relates to a thermoplastic resin composition with which a molded article that is excellent in terms of color forming property, weather resistance, and impact resistance and is particularly excellent in terms of weather-resistant color forming property can be produced and a molded article produced by molding the thermoplastic resin composition.

BACKGROUND ART

Vehicle exterior parts, such as door mirrors, pillars, garnishes, molding, fenders, bumpers, front grilles, and cowls, are required to have not only excellent impact resistance and excellent weather resistance but also high appearance quality appropriate to the graphical design function of quality products. Specifically, the vehicle exterior parts are required to have high color forming property, that is, in particular, a property of forming jet black.

In the production of vehicle exterior parts and the like, molded articles have been coated with a paint in order to enhance appearance quality. However, the production methods including painting increase environmental loads, the complexity of the process, and the rejection rate. Accordingly, there have been attempts to omit the coating of the molded articles by using a thermoplastic resin including a colorant.

For example, PTL 1 discloses a thermoplastic resin composition with which a molded body that has a highly jet black-tinted appearance even without painting or with only clear coating, prevents the leakage of light from the inside of a product, and has suitable heat resistance, suitable impact resistance, and high surface hardness can be produced. This thermoplastic resin composition includes a graft copolymer (A), a copolymer (B) including an aromatic vinyl monomer unit and an unsaturated nitrile monomer unit, an acrylic resin (C), carbon black (D), and a dye (E), wherein the content of a component insoluble in acetone is 5% to 25% by mass, the content of methacrylate ester units and/or acrylate ester units in a component soluble in acetone is 35% to 85% by mass, and the component soluble in acetone includes a specific compound unit at a predetermined proportion.

PTL 2 proposes a thermoplastic resin composition excellent in terms of impact resistance, weather resistance, color forming property, etc., the thermoplastic resin composition including a mixture of a methacrylate ester resin, which is a hard resin, with an AES resin and being colored in black with an organic dye prepared by mixing a plurality of fundamental-color synthetic dyes with one another to form black.

PTL 1: JP 2015-93910 A
PTL 2: JP 2005-132970 A

Since the resin components of the thermoplastic resin compositions known in the related art do not have sufficiently high transparency or sufficiently high weather-resistant transparency, the thermoplastic resin compositions were poor in terms of property of forming colors with dyes, that is, in particular, property of forming jet black, and weather-resistant color forming property. Thus, the jet black-tinted appearance may become degraded with time.

SUMMARY OF INVENTION

An object of the present invention is to provide a thermoplastic resin composition with which a molded article that is excellent in terms of color forming property, weather resistance, impact resistance, and, in particular, weather-resistant color forming property can be produced and a molded article produced by molding the thermoplastic resin composition.

The inventor of the present invention found that a molded article that is excellent in terms of color forming property, weather resistance, and impact resistance and is markedly excellent particularly in terms of weather-resistant color forming property can be produced by using a thermoplastic resin composition including a graft copolymer (B) produced by graft polymerization of a vinyl monomer mixture (m1) including an alkyl (meth)acrylate ester, a vinyl cyanide compound, and an aromatic vinyl compound in the presence of a copolymer (A) produced using an alkyl (meth)acrylate ester (a) and a (meth)acrylate ester (b) including an aromatic hydrocarbon group at a predetermined ratio, the copolymer (A) having a specific volume-average particle size and a specific particle size distribution; and a copolymer (C) that is a product of a polymerization reaction of a vinyl monomer mixture (m2) including an alkyl (meth)acrylate ester.

The present invention has a gist as below:

[1] A thermoplastic resin composition comprising:
a graft copolymer (B) produced by graft polymerization of a vinyl monomer mixture (m1) including an alkyl (meth)acrylate ester, a vinyl cyanide compound, and an aromatic vinyl compound onto a copolymer (A), the copolymer (A) being a copolymer of an alkyl (meth)acrylate ester (a) and a (meth)acrylate ester (b) including an aromatic hydrocarbon group; and
a copolymer (C) that is a product of a polymerization reaction of a vinyl monomer mixture (m2) including an alkyl (meth)acrylate ester,
wherein the graft copolymer (B) includes at least a graft copolymer (B) having a volume-average particle size of 300 to 800 nm,
wherein, relative to 100% by mass of a total content of a unit of the alkyl (meth)acrylate ester (a) and a unit of the (meth)acrylate ester (b) including an aromatic hydrocarbon group in the copolymer (A), a content of the unit of the alkyl (meth)acrylate ester (a) in the copolymer (A) is 67% to 83% by mass and a content of the unit of the (meth)acrylate ester (b) including an aromatic hydrocarbon group in the copolymer (A) is 17% to 33% by mass,
wherein the copolymer (A) has a volume-average particle size (X) of 50 to 800 nm, and
wherein the volume-average particle size (X), a frequency upper limit 10%-volume particle size (Y), and a frequency lower limit 10%-volume particle size (Z) satisfy (1) and (2) below:
(1) Y/X≤1.4
(2) Z/X≥0.6
where X represents the volume-average particle size (X) of the copolymer (A), Y represents the frequency upper limit 10%-volume particle size (Y) that is a particle size of the copolymer (A) at which a cumulative frequency calculated from an upper limit of a particle size distribution curve of the copolymer (A) reaches 10%, and Z represents the frequency lower limit 10%-volume particle size (Z) that is a particle size of the copolymer (A) at which a cumulative frequency calculated from a lower limit of the particle size distribution curve of the copolymer (A) reaches 10%.

[2] The thermoplastic resin composition according to [1], wherein, relative to 100 parts by mass of a total content of the graft copolymer (B) and the copolymer (C), a content of the graft copolymer (B) is 10 to 50 parts by mass and a content of the copolymer (C) is 50 to 90 parts by mass.

[3] The thermoplastic resin composition according to [1] or [2], wherein a content of the alkyl (meth)acrylate ester in the vinyl monomer mixture (m1) is 10% to 30% by mass, a content of the vinyl cyanide compound in the vinyl monomer mixture (m1) is 10% to 30% by mass, and a content of the aromatic vinyl compound in the vinyl monomer mixture (m1) is 50% to 70% by mass.

[4] The thermoplastic resin composition according to any one of [1] to [3], wherein, relative to 100% by mass of a total content of the copolymer (A) and the vinyl monomer mixture (m1) in the graft copolymer (B), a proportion of the copolymer (A) is 50% to 80% by mass and a proportion of the vinyl monomer mixture (m1) is 20% to 50% by mass.

[5] The thermoplastic resin composition according to any one of [1] to [4], further comprising a dye (D).

[6] A molded article produced by molding the thermoplastic resin composition according to any one of [1] to [5].

Advantageous Effects of Invention

The thermoplastic resin composition according to the present invention enables the production of a molded article that is excellent in terms of color forming property, weather resistance, and impact resistance and is markedly excellent particularly in terms of weather-resistant color forming property.

Accordingly, the molded article according to the present invention, which is produced by molding the thermoplastic resin composition according to the present invention, can be suitably used as vehicle exterior parts, such as door mirrors, pillars, garnishes, molding, fenders, bumpers, front grilles, and cowls, and are capable of maintaining a suitable appearance over a long period of time even without painting.

DESCRIPTION OF EMBODIMENTS

An embodiment of the present invention is described below in detail.

The term "(meth)acrylic acid" used herein refers to either or both "acrylic acid" and "methacrylic acid". The same applies to the term "(meth)acrylate".

The term "unit" used herein refers to a structural element derived from a monomeric compound (monomer) present before polymerization. For example, the term "unit of a (meth)acrylate ester (a)" refers to "structural element derived from a (meth)acrylate ester(a)".

The proportion of the unit of each of the monomers constituting a polymer corresponds to the proportion of the monomer in a monomer mixture used for producing the polymer.

Thermoplastic Resin Composition

The thermoplastic resin composition according to the present invention includes a graft copolymer (B) (hereinafter, may be referred to as "graft copolymer (B) according to the present invention) produced by graft polymerization of a vinyl monomer mixture (m1) including an alkyl (meth) acrylate ester, a vinyl cyanide compound, and an aromatic vinyl compound onto a copolymer (A) (hereinafter, may be referred to as "copolymer (A) according to the present invention), the copolymer (A) being a copolymer of an alkyl (meth)acrylate ester (a) and a (meth)acrylate ester (b) including an aromatic hydrocarbon group; and a copolymer (C) that is the product of the polymerization reaction of a vinyl monomer mixture (m2) including an alkyl (meth) acrylate ester. The graft copolymer (B) according to the present invention includes at least a graft copolymer (B) having a volume-average particle size of 300 to 800 nm. Relative to 100% by mass of the total content of a unit of the alkyl (meth)acrylate ester (a) and a unit of the (meth)acrylate ester (b) including an aromatic hydrocarbon group in the copolymer (A) according to the present invention which is included in the thermoplastic resin composition according to the present invention, the content of the unit of the alkyl (meth)acrylate ester (a) in the copolymer (A) is 67% to 83% by mass and the content of the unit of the (meth)acrylate ester (b) including an aromatic hydrocarbon group in the copolymer (A) is 17% to 33% by mass, wherein the copolymer (A) has a volume-average particle size (X) of 50 to 800 nm, and wherein the volume-average particle size (X), a frequency upper limit 10%-volume particle size (Y), and a frequency lower limit 10%-volume particle size (Z) satisfy (1) and (2) below:

(1) $Y/X \leq 1.4$ (2) $Z/X \geq 0.6$ where X represents the volume-average particle size (X) of the copolymer (A), Y represents the frequency upper limit 10%-volume particle size (Y) that is the particle size of the copolymer (A) at which the cumulative frequency calculated from the upper limit of the particle size distribution curve of the copolymer (A) reaches 10%, and Z represents the frequency lower limit 10%-volume particle size (Z) that is the particle size of the copolymer (A) at which the cumulative frequency calculated from the lower limit of the particle size distribution curve of the copolymer (A) reaches 10%.

Copolymer (A)

The copolymer (A) according to the present invention is a copolymer of an alkyl (meth)acrylate ester (a) and a (meth)acrylate ester (b) including an aromatic hydrocarbon group.

The alkyl (meth)acrylate ester (a) is preferably an alkyl (meth)acrylate ester including an alkyl group having 1 to 12 carbon atoms. Among such alkyl (meth)acrylate esters, n-butyl acrylate, 2-ethylhexyl acrylate, and ethyl acrylate are particularly preferable in order to enhance the impact resistance of the thermoplastic resin composition according to the present invention which includes the graft copolymer (B).

The alkyl (meth)acrylate esters (a) may be used alone or in combination of two or more.

The (meth)acrylate ester (b) including an aromatic hydrocarbon group may be any (meth)acrylate ester including an aromatic hydrocarbon group, such as a phenyl group or a benzyl group, or a group including such an aromatic hydrocarbon group. Examples thereof include, but are not limited to, an aryl (meth)acrylate ester, an aryloxy (meth)acrylate ester, and an alkyl (meth)acrylate ester including an aryl group, such as a phenyl group, or an aryloxy group, such as a phenoxy group, as a substituent attached to the alkyl ester portion.

The (meth)acrylate ester (b) including an aromatic hydrocarbon group is particularly preferably benzyl acrylate or 2-phenoxyethyl acrylate in order to enhance the impact resistance of the thermoplastic resin composition according to the present invention which includes the graft copolymer (B).

The (meth)acrylate esters (b) including an aromatic hydrocarbon group may be used alone or in combination of two or more.

The content of the unit of the alkyl (meth)acrylate ester (a) in the copolymer (A) according to the present invention is 67% to 83% by mass and the content of the unit of the (meth)acrylate ester (b) including an aromatic hydrocarbon group in the copolymer (A) is 17% to 33% by mass relative to 100% by mass of the total content of the unit of the alkyl (meth)acrylate ester (a) and the unit of the (meth)acrylate ester (b) including an aromatic hydrocarbon group in the copolymer (A). When the contents of the unit of the alkyl (meth)acrylate ester (a) and the unit of the (meth)acrylate ester (b) including an aromatic hydrocarbon group fall within the above ranges, the thermoplastic resin composition according to the present invention, which includes the graft copolymer (B) produced using the copolymer (A), has excellent transparency, excellent color forming property, and excellent impact resistance.

From the above viewpoints, the content of the unit of the alkyl (meth)acrylate ester (a) in the copolymer (A) according to the present invention is preferably 70% to 80% by mass and the content of the unit of the (meth)acrylate ester (b) including an aromatic hydrocarbon group in the copolymer (A) is preferably 20% to 30% by mass relative to 100% by mass of the total content of the unit of the alkyl (meth)acrylate ester (a) and the unit of the (meth)acrylate ester (b) including an aromatic hydrocarbon group in the copolymer (A).

When the content of the alkyl (meth)acrylate ester (a) is equal to or more than the above lower limit, suitable transparency and suitable impact resistance are achieved. When the content of the alkyl (meth)acrylate ester (a) is equal to or less than the above upper limit, suitable transparency is achieved and suitable color forming property may be achieved.

The contents of the unit of the (meth)acrylate ester (a) and the unit of the (meth)acrylate ester (b) including an aromatic hydrocarbon group in the copolymer (A) may be determined by heating the copolymer (A), the graft copolymer (B), the thermoplastic resin composition including the graft copolymer (B) and the copolymer (C) described below, or a molded article produced by molding the thermoplastic resin composition at 600° C. to decompose them into monomer units and subsequently conducting a component analysis using a GC-MS apparatus.

As described above, the proportions of the amounts of the alkyl (meth)acrylate ester (a) and the (meth)acrylate ester (b) including an aromatic hydrocarbon group that are used in the production of the copolymer (A) to the total amount of the alkyl (meth)acrylate ester (a) and the (meth)acrylate ester (b) including an aromatic hydrocarbon group correspond to the contents of the unit of the alkyl (meth)acrylate ester (a) and the unit of the (meth)acrylate ester (b) including an aromatic hydrocarbon group in the copolymer (A), respectively.

The copolymer (A) according to the present invention is preferably a copolymer including either or both of a unit derived from a crosslinking agent and a unit derived from a graft-crossing agent in addition to the alkyl (meth)acrylate ester (a) and the (meth)acrylate ester (b) including an aromatic hydrocarbon group. When the copolymer (A) includes the unit derived from a graft-crossing agent and/or a crosslinking agent, the impact resistance of the thermoplastic resin composition including the graft copolymer (B) according to the present invention may be further enhanced.

Examples of the graft-crossing agent include allyl compounds. Specific examples thereof include allyl methacrylate, triallyl cyanurate, and triallyl isocyanurate. The above graft-crossing agents may be used alone or in a mixture of two or more.

Examples of the crosslinking agent include dimethacrylate compounds. Specific examples thereof include ethylene glycol dimethacrylate, propylene glycol dimethacrylate, 1,3-butylene glycol dimethacrylate, and 1,4-butylene glycol dimethacrylate. The above crosslinking agents may be used alone or in a mixture of two or more.

In the case where the crosslinking agent and/or the graft-crossing agent is used, the content of the unit derived from the crosslinking agent and/or the graft-crossing agent in the copolymer (A) according to the present invention is preferably 0.1% to 3% by mass and is more preferably 0.2% to 2% by mass relative to 100% by mass of the total contents of the unit of the alkyl (meth)acrylate ester (a), the unit of the (meth)acrylate ester (b) including an aromatic hydrocarbon group, and the unit derived from the crosslinking agent and/or the unit derived from the graft-crossing agent, in order to enhance the impact resistance of the thermoplastic resin composition including the graft copolymer (B) according to the present invention.

The copolymer (A) may include a monomer unit other than the unit of the alkyl (meth)acrylate ester (a), the unit of the (meth)acrylate ester (b) including an aromatic hydrocarbon group, or the unit derived from the crosslinking agent and/or the graft-crossing agent, which is optionally used as needed, such that the object of the present invention is not impaired.

Examples of the other monomer unit that may be included in the copolymer (A) according to the present invention include one or more vinyl monomers that are included in the vinyl monomer mixture (m1) described below and that are other than the alkyl (meth)acrylate ester (a) or the (meth)acrylate ester (b) including an aromatic hydrocarbon group. The content of the other vinyl monomer unit is preferably 20% by mass or less and is particularly preferably 10% by mass or less relative to 100% by mass of the copolymer (A) according to the present invention in order to achieve the advantageous effects of the present invention in an effective manner.

The method for producing the copolymer (A) is not limited; it is preferable to perform emulsion polymerization or miniemulsion polymerization of a mixture including the alkyl (meth)acrylate ester (a), the (meth)acrylate ester (b) including an aromatic hydrocarbon group, and the crosslinking agent and/or the graft-crossing agent. It is particularly preferable to use a method in which miniemulsion polymerization is performed, in order to enhance the physical properties of the resin composition including the graft copolymer (B).

Examples of the method for producing the copolymer (A) using an emulsion polymerization method include a method in which a radical initiator, the alkyl (meth)acrylate ester (a), the (meth)acrylate ester (b) including an aromatic hydrocarbon group, and the crosslinking agent and/or the graft-crossing agent are added to an aqueous solvent and copolymerization is performed in the presence of an emulsifier.

The addition of the radical initiator, the alkyl (meth)acrylate ester (a), the (meth)acrylate ester (b) including an aromatic hydrocarbon group, and the crosslinking agent and/or the graft-crossing agent may be done in one batch, in several batches, or continuously.

Examples of the miniemulsion polymerization method used for producing the copolymer (A) include, but are not limited to, a method including a step of mixing the alkyl (meth)acrylate ester (a), the (meth)acrylate ester (b) including an aromatic hydrocarbon group, the crosslinking agent and/or the graft-crossing agent, a hydrophobic substance, and an initiator with one another, adding water and an emulsifier to the resulting mixture, and applying a shear force to the mixture to prepare a pre-emulsion (miniemulsion); and a step of heating the mixture to a polymerization-start temperature to perform polymerization.

In the miniemulsion formation step, for example, a shearing step using ultrasound irradiation is conducted. This causes the monomers to be torn by the shear force to form fine monomer oil droplets covered with the emulsifier. Subsequently, heating is performed to the polymerization-start temperature of the initiator in order to directly polymerize the fine monomer oil droplets. Hereby, polymer microparticles are produced.

Publicly known methods may be used for generating the shear force used for forming the pre-emulsion. Examples of a high-shear apparatus used for forming the pre-emulsion include, but are not limited to, an emulsification apparatus that includes a high-pressure pump and an interaction chamber; and an apparatus that uses ultrasonic energy or high frequency to form a miniemulsion. Examples of the emulsification apparatus that includes a high-pressure pump and an interaction chamber include "Pressure Homogenizer" produced by SPX Corporation APV and "Microfluidizer" produced by Powrex Corporation. Examples of the apparatus that uses ultrasonic energy or high frequency to form a miniemulsion include "Sonic Dismembrator" produced by Fisher Scient and "ULTRASONIC HOMOGENIZER" produced by NIHONSEIKI KAISHA LTD.

In order to enhance workability, stability, productivity, and the like, the amount of the aqueous solvent used for preparing the pre-emulsion is preferably set to about 100 to 500 parts by mass relative to 100 parts by mass of the amount of the mixture excluding water such that the concentration of the solid component in the reaction system after polymerization is about 5% to 50% by mass.

In the production of the rubbery polymer (A) according to the present invention, a hydrophobic substance is preferably used at a predetermined proportion. Using a hydrophobic substance in the preparation of the pre-emulsion may enhance the production consistency of miniemulsion polymerization and enable the production of a rubbery polymer (A) suitable for the present invention.

Examples of the hydrophobic substance include a hydrocarbon having 10 or more carbon atoms, an alcohol having 10 or more carbon atoms, a hydrophobic polymer having a mass-average molecular weight (Mw) of less than 10000, and a hydrophobic monomer, such as a vinyl ester of an alcohol having 10 to 30 carbon atoms, a vinyl ether of an alcohol having 12 to 30 carbon atoms, an alkyl (meth) acrylate having 12 to 30 carbon atoms, a carboxylic acid vinyl ester having 10 to 30 carbon atoms (preferably having 10 to 22 carbon atoms), p-alkylstyrene, a hydrophobic chain-transfer agent, and a hydrophobic peroxide. The above hydrophobic substances may be used alone or in a mixture of two or more.

Specific examples of the hydrophobic substance include hexadecane, octadecane, icosane, liquid paraffin, liquid isoparaffin, a paraffin wax, a polyethylene wax, an olive oil, cetyl alcohol, stearyl alcohol, lauryl acrylate, stearyl acrylate, lauryl methacrylate, stearyl methacrylate, polystyrene and poly (meth)acrylate having a number-average molecular weight (Mn) of 500 to 10000, or the like.

The amount of the hydrophobic substance used is preferably 0.1 to 10 parts by mass and is more preferably 1 to 3 parts by mass relative to 100 parts by mass of the total amount of the alkyl (meth)acrylate ester (a), the (meth) acrylate ester (b) including an aromatic hydrocarbon group, and the crosslinking agent and/or the graft-crossing agent, in order to readily control the particle size of the copolymer (A).

In the production of the rubbery polymer (A) according to the present invention, the following publicly known emulsifiers may be used: carboxylic acid emulsifiers, such as alkali metal salts of oleic acid, palmitic acid, stearic acid, and rosin acid and alkali metal salts of alkenylsuccinic acids; and anionic emulsifiers selected from an alkyl sulfate ester, sodium alkylbenzene sulfonate, sodium alkyl sulfosuccinate, polyoxyethylene nonyl phenyl ether sulfate ester sodium, and the like. The above emulsifiers may be used alone or in combination of two or more.

The amount of the emulsifier used is preferably 0.01 to 3.0 parts by mass and is particularly preferably 0.05 to 2.0 parts by mass relative to 100 parts by mass of the total amount of the alkyl (meth)acrylate ester (a), the (meth)acrylate ester (b) including an aromatic hydrocarbon group, and the crosslinking agent and/or the graft-crossing agent, in order to readily control the particle size of the copolymer (A).

The initiator is a radical polymerization initiator for radical polymerization of the aforementioned crosslinking agent (I) and (meth)acrylate ester(a) and other vinyl compounds used as necessary. Examples of the initiator include an azo polymerization initiator, a photopolymerization initiator, an inorganic peroxide, an organic peroxide, and a redox initiator that includes an organic peroxide, a transition metal, and a reductant. Among these, an azo polymerization initiator, an inorganic peroxide, an organic peroxide, and a redox initiator, which initiates polymerization upon being heated, are preferable. The above polymerization initiators may be used alone or in combination of two or more.

Examples of the azo polymerization initiator include 2,2'-azobis(4-methoxy-2,4-dimethylvaleronitrile), 2,2'-azobis(2,4-dimethylvaleronitrile), 2,2'-azobisisobutyronitrile, 2,2'-azobis(2-methylbutyronitrile), 1,1'-azobis(cyclohexane-1-carbonitrile), 1-[(1-cyano-1-methylethyl)azo]formamide, 4,4'-azobis(4-cyanovaleric acid), dimethyl 2,2'-azobis(2-methylpropionate), dimethyl 1,1'-azobis(1-cyclohexanecarboxylate), 2,2'-azobis[2-methyl-N-(2-hydroxyethyl)propionamide], 2,2'-azobis(N-butyl-2-methylpropionamide), 2,2'-azobis(N-cyclohexyl-2-methylpropionamide), 2,2'-azobis[2-(2-imidazolin-2-yl) propane], and 2,2'-azobis(2,4,4-trimethylpentane).

Examples of the inorganic peroxide include potassium persulfate, sodium persulfate, ammonium persulfate, and hydrogen peroxide.

Examples of the organic peroxide include peroxy esters. Specific examples thereof include α, α'-bis(neodecanoylperoxy)diisopropylbenzene, cumyl peroxyneodecanoate, 1,1,3,3-tetramethylbutyl peroxyneodecanoate, 1-cyclohexyl-1-methylethyl peroxyneodecanoate, t-hexyl peroxyneodecanoate, t-butyl peroxyneodecanoate, t-hexyl peroxypivalate, t-butyl peroxypivalate, 1,1,3,3-tetramethylbutyl peroxy-2-ethylhexanoate, 2,5-dimethyl-2,5-bis(2-ethylhexanoyl peroxy)hexane, 1-cyclohexyl-1-methylethyl peroxy-2-ethylhexanoate, t-hexyl peroxy 2-hexylhexanoate, t-butyl peroxy 2-hexylhexanoate, t-butyl peroxyisobutyrate, t-hexyl peroxy isopropyl monocarbonate, t-butyl peroxymaleic acid, t-butyl peroxy 3,5,5-trimethylhexanoate, t-butyl peroxylaurate, 2,5-dimethyl-2,5-bis(m-toluoyl peroxy) hexane, t-butyl peroxy isopropyl monocarbonate, t-butyl peroxy 2-ethylhexyl monocarbonate, t-hexyl peroxybenzoate, 2,5-dimethyl-2,5-bis(benzoyl peroxy)hexane, t-butyl peroxyacetate, t-butyl peroxy-m-toluoyl benzoate, t-butyl peroxybenzoate, bis(t-butylperoxy)isophthalate, 1,1-bis(t-hexylperoxy)3,3,5-trimethylcyclohexane, 1,1-bis(t-hexylperoxy)cyclohexane, 1,1-bis(t-butylperoxy)3,3,5-trimethylcyclohexane, 1,1-bis(t-butylperoxy)cyclohexane, 1,1-bis(t-butylperoxy)cyclododecane, 2,2-bis(t-butylperoxy)butane, n-butyl 4,4-bis(t-butylperoxy)valerate, 2,2-bis(4,4-di-t-butylperoxycyclohexyl)propane, α,α'-bis(t-butylperoxide) diisopropylbenzene, dicumyl peroxide, 2,5-dimethyl-2,5-bis(t-butylperoxy)hexane, t-butyl cumyl peroxide, di-t-butyl peroxide, cumene hydroperoxide, diisopropylbenzene hydroperoxide, dilauroyl peroxide, diisononanoyl peroxide, t-butyl hydroperoxide, benzoyl peroxide, lauroyl peroxide, dimethyl bis(t-butylperoxy)-3-hexyne, bis(t-butylperoxy isopropyl)benzene, bis(t-butylperoxy)trimethylcyclohexane, butyl-bis(t-butylperoxy)valerate, t-butyl 2-ethylhexane peroxide, dibenzoyl peroxide, para-menthane hydroperoxide, and t-butyl peroxybenzoate.

The redox initiator preferably includes an organic peroxide, ferrous sulfate, a chelating agent, and a reductant. Examples of such a redox initiator include a redox initiator including cumene hydroperoxide, ferrous sulfate, sodium pyrophosphate, and dextrose; and a redox initiator including t-butyl hydroperoxide, sodium formaldehyde sulfoxylate (Rongalite), ferrous sulfate, and disodium ethylenediaminetetraacetate.

Among the above initiators, an organic peroxide is particularly preferable.

The amount of the initiator used is normally 5 parts by mass or less, is preferably 3 parts by mass or less, and is, for example, 0.001 to 3 parts by mass relative to 100 parts by mass of the total amount of the alkyl (meth)acrylate ester (a), the (meth)acrylate ester (b) including an aromatic hydrocarbon group, and the crosslinking agent and/or the graft-crossing agent.

The above pre-emulsion preparation step is normally conducted at normal temperature (about 10° C. to 50° C.). The miniemulsion polymerization step is conducted at 40° C. to 100° C. for about 30 to 600 minutes.

The particle size of the copolymer (A) according to the present invention is commonly 50 to 800 nm, is preferably 100 to 600 nm, and is more preferably 250 to 450 nm in terms of volume-average particle size. When the volume-average particle size falls within the above range, the amount of aggregates formed during polymerization is small and, consequently, the impact resistance of the thermoplastic resin composition according to the present invention, which includes the graft copolymer (B) produced using the copolymer (A), can be further enhanced.

The copolymer (A) according to the present invention commonly satisfies the following relationships (1) and (2):
(1) $Y/X \leq 1.4$
(2) $Z/X \geq 0.6$
where X represents the volume-average particle size (X) of the copolymer (A), Y represents the frequency upper limit 10%-volume particle size (Y) that is the particle size of the copolymer (A) at which the cumulative frequency calculated from the upper limit of the particle size distribution curve of the copolymer (A) reaches 10%, and Z represents the frequency lower limit 10%-volume particle size (Z) that is the particle size of the copolymer (A) at which the cumulative frequency calculated from the lower limit of the particle size distribution curve of the copolymer (A) reaches 10%.

When the relationships (1) and (2) are satisfied, the particle size distribution can be further narrowed and, consequently, the thermoplastic resin composition according to the present invention has suitable impact resistance and suitable color forming property. The particle size distribution of the copolymer (A) according to the present invention satisfies at least the relationships (1) and (2) above and preferably satisfies the relationships (1A) and (2A) below in consideration of the impact resistance of the thermoplastic resin composition according to the present invention.
(1A) $1.0 \leq Y/X \leq 1.3$
(2A) $0.7 \geq Z/X \geq 1.0$ The method for controlling the average particle size and particle size distribution of the copolymer (A) to fall within the above suitable ranges is not limited; for example, the type or amount of the emulsifier used may be adjusted.

The volume-average particle size (X), frequency upper limit 10%-volume particle size (Y), and frequency lower limit 10%-volume particle size (Z) of the copolymer (A) according to the present invention are measured by the method described in Examples below while, for example, the copolymer (A) is dispersed in the aqueous dispersion described above.

Graft Copolymer (B)

The graft copolymer (B) according to the present invention is a graft copolymer produced by graft polymerization of a vinyl monomer mixture (m1) including an alkyl (meth)acrylate ester, a vinyl cyanide compound, and an aromatic vinyl compound onto the copolymer (A) according to the present invention.

The graft copolymer (B) according to the present invention is produced by polymerizing a vinyl monomer mixture (m1) including an alkyl (meth)acrylate ester, a vinyl cyanide compound, and an aromatic vinyl compound in the presence of the copolymer (A) according to the present invention.

The alkyl (meth)acrylate ester included in the vinyl monomer mixture (m1) is preferably an alkyl (meth)acrylate ester including an alkyl group having 1 to 20 carbon atoms. The number of the carbon atoms included in the alkyl group is particularly preferably 1 to 10. The above alkyl group may be a linear alkyl group, a branched alkyl group, or a cycloalkyl group and is preferably a linear alkyl group.

Examples of the alkyl (meth)acrylate ester include alkyl acrylate esters, such as methyl acrylate, ethyl acrylate, n-propyl acrylate, i-propyl acrylate, n-butyl acrylate, i-butyl acrylate, t-butyl acrylate, amyl acrylate, isoamyl acrylate, octyl acrylate, 2-ethylhexyl acrylate, decyl acrylate, lauryl acrylate, stearyl acrylate, cyclohexyl acrylate, pentyl acrylate, and benzyl acrylate; and alkyl methacrylate esters, such as methyl methacrylate, ethyl methacrylate, n-propyl methacrylate, i-propyl methacrylate, n-butyl methacrylate, i-butyl methacrylate, t-butyl methacrylate, amyl methacrylate, isoamyl methacrylate, octyl methacrylate, 2-ethylhexyl methacrylate, decyl methacrylate, lauryl methacrylate, cyclohexyl methacrylate, and benzyl methacrylate.

Among these, methyl acrylate, methyl methacrylate, and ethyl methacrylate are preferable, and methyl methacrylate and ethyl methacrylate are more preferable in order to enhance the transparency, that is the color forming property, impact resistance, and weather resistance of a molded article produced by molding the thermoplastic resin composition including the graft copolymer (B).

The above alkyl (meth)acrylate esters may be used alone or in combination of two or more.

It is particularly preferable that the alkyl (meth)acrylate ester included in the vinyl monomer mixture (m1) have the same structure as the alkyl (meth)acrylate ester included in the vinyl monomer mixture (m2) described below in consideration of the color forming property, impact resistance, and weather resistance of the thermoplastic resin composition according to the present invention and a molded article produced by molding the thermoplastic resin composition.

The content of the alkyl (meth)acrylate ester in the vinyl monomer mixture (m1) is preferably, but not limited to, 10% to 30% by mass in order to enhance the balance between the impact resistance and color forming property of the thermoplastic resin composition according to the present invention and a molded article produced by molding the thermoplastic resin composition.

Examples of the vinyl cyanide compound included in the vinyl monomer mixture (m1) include acrylonitrile and methacrylonitrile. Among these, acrylonitrile is preferable in order to enhance the transparency, that is the color forming property and impact resistance of the molded article.

The above vinyl cyanide compounds may be used alone or in combination of two or more.

The content of the vinyl cyanide compound in the vinyl monomer mixture (m1) is preferably, but not limited to, 10% to 30% by mass in order to enhance the balance between the impact resistance and color forming property of the thermoplastic resin composition according to the present invention and a molded article produced by molding the thermoplastic resin composition.

Examples of the aromatic vinyl compound included in the vinyl monomer mixture (m1) include styrene, α-methylstyrene, o-, m-, or p-methylstyrene, vinylxylene, p-t-butylstyrene, and ethylstyrene. Among these, styrene is preferable in order to enhance the color forming property and impact resistance of the molded article.

The above aromatic vinyl compounds may be used alone or in combination of two or more.

The content of the aromatic vinyl compound in the vinyl monomer mixture (m1) is preferably, but not limited to, 50% to 70% by mass in order to enhance the balance between the impact resistance and color forming property of the thermoplastic resin composition according to the present invention and a molded article produced by molding the thermoplastic resin composition.

The vinyl monomer mixture (m1) may further include a monomer that is other than the above alkyl (meth)acrylate ester, the vinyl cyanide compound, or the aromatic vinyl compound and copolymerizable with the above monomers in order to reduce the depolymerization of alkyl acrylate esters, such as methyl acrylate and ethyl acrylate.

Examples of the other monomer include N-cycloalkylmaleimides, such as N-methylmaleimide, N-ethylmaleimide, N-n-propylmaleimide, N-i-propylmaleimide, N-n-butylmaleimide, N-i-butylmaleimide, N-tert-butylmaleimide, and N-cyclohexylmaleimide; N-arylmaleimides, such as N-phenylmaleimide, N-alkyl-substituted phenylmaleimide, and N-chlorophenylmaleimide; and maleimide compounds, such as N-aralkylmaleimide. The above monomers may be used alone or in combination of two or more.

The graft copolymer (B) according to the present invention is constituted by the copolymer (A) according to the present invention and the vinyl monomer mixture (m1), which includes the alkyl (meth)acrylate ester, the vinyl cyanide compound, and the aromatic vinyl compound, grafted onto the copolymer (A).

The amounts of the copolymer (A) and the vinyl monomer mixture (m1) used for producing the graft copolymer (B) are preferably 50% to 80% by mass and 20% to 50% by mass, respectively, relative to 100% by mass of the graft copolymer (B) in order to enhance the physical properties of the thermoplastic resin composition according to the present invention including the graft copolymer (B) and a molded article produced by molding the thermoplastic resin composition in a balanced manner.

The graft ratio of the graft copolymer (B) according to the present invention is preferably 25% to 100% in order to enhance the physical properties of the thermoplastic resin composition according to the present invention including the graft copolymer (B) and a molded article produced by molding the thermoplastic resin composition in a balanced manner. The graft ratio of the graft copolymer (B) is measured by the method described in Examples below.

The graft copolymer (B) is produced by a known method, such as bulk polymerization, solution polymerization, bulk suspension polymerization, suspension polymerization, or emulsion polymerization. Emulsion polymerization is preferable in order to enhance the physical properties of the thermoplastic resin composition including the graft copolymer (B) and a molded article produced by molding the thermoplastic resin composition according to the present invention in a balanced manner.

Examples of the emulsification graft polymerization method include a method in which the vinyl monomer mixture (m1) is used in one batch or on a continuous or intermittent basis in the presence of an emulsion of the copolymer (A) according to the present invention to cause radical polymerization.

In the graft polymerization method, a chain transfer agent may be optionally used to control the molecular weight and graft ratio of the graft polymer (B). Furthermore, known inorganic electrolytes and the like may be optionally used to control the viscosity and pH of the latex. In the emulsification graft polymerization method, various emulsifiers and radical initiators may be optionally used as needed.

The types and amounts of the emulsifier and the radical initiator used are not limited. Examples of the emulsifier and the radical initiator are the same as the examples of the emulsifier and the radical initiator which are described in the description of the copolymer (A).

Examples of the method for recovering the graft copolymer (B) from an aqueous dispersion of the graft copolymer (B) include the following:

(i) A method in which the aqueous dispersion of the graft copolymer (B) is charged into hot water containing a coagulant dissolved therein in order to coagulate the graft copolymer (B) in the form of a slurry (wet process).

(ii) A method in which the aqueous dispersion of the graft copolymer (B) is sprayed into a heating atmosphere in order to recover the graft copolymer (B) in a semi-direct manner (spray drying).

Examples of the coagulant include inorganic acids, such as sulfuric acid, hydrochloric acid, phosphoric acid, and nitric acid; and metal salts, such as calcium chloride, calcium acetate, and aluminum sulfate. The coagulant is selected in accordance with the type of the emulsifier used for the polymerization reaction. Any type of coagulant may be used in the case where only carboxylic acid soap, such as fatty acid soap or rosin acid soap, is used as an emulsifier. It is necessary to use a metal salt in the case where an emulsifier that exhibits a consistent emulsifying capacity even in an acidic region, such as sodium dodecylbenzenesulfonate, is used.

Examples of the method for obtaining a dried graft copolymer (B) from a slurry of the graft copolymer (B) include the following:

(i) A method in which the slurry is cleaned in order to cause the emulsifier residue that remains in the slurry to elute into water, then dehydrated with a centrifugal or press dehydrator, and subsequently dried with a flash drier or the like.

(ii) A method in which dehydration and drying are performed simultaneously with a squeeze dehydrator, an extruder, or the like.

Subsequent to the drying process, the graft copolymer (B) is produced in the form of a powder or particles.

The graft copolymer (B) discharged from the squeeze dehydrator or extruder may be fed directly to an extruder or molding machine used for producing the thermoplastic resin composition.

The graft copolymer (B) according to the present invention, which is included in the thermoplastic resin composition according to the present invention, includes at least a graft copolymer (B) having a volume-average particle size of 300 to 800 nm and preferably having a volume-average particle size of 350 to 600 nm. When the graft copolymer (B) according to the present invention includes a graft copolymer (B) having a volume-average particle size of 300 to 800 nm, the thermoplastic resin composition has suitable impact resistance.

It is preferable that the thermoplastic resin composition according to the present invention include two or more types of graft copolymers (B) having different volume-average particle sizes in a mixed manner in order to further enhance impact resistance.

In such a case, it is preferable to use a graft copolymer (B) having relatively large particle sizes and a volume-average particle size of 300 to 800 nm (hereinafter, this graft copolymer (B) may be referred to as "graft copolymer (Ba)") and a graft copolymer (B) having relatively small particle sizes and a volume-average particle size of 50 to 150 nm (hereinafter, this graft copolymer (B) may be referred to as "graft copolymer (Bb)") in a mixed manner. Using the graft copolymers (Ba) and (Bb) having different particle sizes in a mixed manner reduces the interparticle distance and further enhances impact resistance. The volume-average particle size of the graft copolymer (Ba) is more preferably 350 to 600 nm. The volume-average particle size of the graft copolymer (Bb) is more preferably 80 to 140 nm.

In order to effectively enhance impact resistance by using the graft copolymer (Ba) having relatively large particle sizes and the graft copolymer (Bb) having relatively small particle sizes in a mixed manner, relative to 100% by mass of the total amount of the graft copolymers (Ba) and (Bb), the proportion of the graft copolymer (Ba) is preferably 20% to 80% by mass and the proportion of the graft copolymer (Bb) is preferably 20% to 80% by mass. It is more preferable that the proportion of the graft copolymer (Ba) be 30% to 70% by mass and the proportion of the graft copolymer (Bb) be 30% to 70% by mass.

Using the graft copolymers (Ba) and (Bb) in a combined manner is different from using only one type of graft copolymer (B) having a volume-average particle size intermediate between the volume-average particle sizes of the graft copolymers (Ba) and (Bb) in that using the graft copolymers (Ba) and (Bb) in a combined manner reduces the interparticle distance.

The method for controlling the volume-average particle sizes of the graft copolymers (B), (Ba), and (Bb) to fall within the suitable ranges is not limited; for example, the type or amount of the emulsifier used in the production of the copolymer (A) may be adjusted.

The volume-average particle size of the graft copolymer (B) is measured by the method described in Examples below.

Copolymer (C)

The copolymer (C) is produced by polymerizing a vinyl monomer mixture (m2) including an alkyl (meth)acrylate ester.

The vinyl monomer mixture (m2) includes a (meth) acrylate ester as an essential component in order to enhance the transparency, that is the color forming property and weather resistance of the thermoplastic resin composition according to the present invention and a molded article produced by molding the thermoplastic resin composition.

Examples of the alkyl (meth)acrylate ester included in the vinyl monomer mixture (m2) are the same as the above-described examples of the alkyl (meth)acrylate ester included in the vinyl monomer mixture (m1). Among the above-described alkyl (meth)acrylate esters, methyl acrylate, methyl methacrylate, and ethyl methacrylate are preferable, and methyl methacrylate and ethyl methacrylate are more preferable in order to enhance the color forming property, impact resistance, and weather resistance of the thermoplastic resin composition according to the present invention and a molded article produced by molding the thermoplastic resin composition.

The above alkyl (meth)acrylate esters may be used alone or in combination of two or more. For example, it is preferable to use methyl methacrylate in combination with methyl acrylate at a ratio of 1:0.01 to 0.2 (mass ratio) in order to reduce the depolymerization of the copolymer (C).

The content of the alkyl (meth)acrylate ester in the vinyl monomer mixture (m2) is preferably 60% to 100% by mass in order to enhance the transparency and weather resistance of the thermoplastic resin composition according to the present invention and a molded article produced by molding the thermoplastic resin composition and is more preferably 70% to 100% by mass.

The vinyl monomer mixture (m2) may optionally further include a monomer that is other than the above alkyl (meth)acrylate ester and copolymerizable with the alkyl (meth)acrylate ester, such that the physical properties of the thermoplastic resin composition and a molded article produced by molding the thermoplastic resin composition are not impaired.

Examples of the other monomer include the above-described examples of the vinyl cyanide compound, the aromatic vinyl compound, and the other monomer included in the vinyl monomer mixture (m1). The other monomers may be used alone or in combination of two or more.

The mass-average molecular weight of the copolymer (C) is preferably, but not limited to, 10,000 to 300,000 and is particularly preferably 50,000 to 200,000. When the mass-average molecular weight of the copolymer (C) falls within the above range, the thermoplastic resin composition according to the present invention has excellent flowability and excellent impact resistance.

The mass-average molecular weight of the copolymer (C) is measured by the method described in Examples below.

The method for producing the copolymer (C) is not limited; examples thereof include known polymerization methods, such as emulsion polymerization, suspension polymerization, bulk polymerization, and solution polymerization. Suspension polymerization and bulk polymerization are preferable from the viewpoint of the heat resistance of the thermoplastic resin composition.

Examples of the polymerization initiator used in the production of the copolymer (C) include, but are not limited to, organic peroxides.

A chain transfer agent may be optionally used to control the molecular weight of the copolymer (C) in the production of the copolymer (C). Examples of the chain transfer agent include, but are not limited to, mercaptans, α-methylstyrene dimer, and terpenes.

Dye (D)

The thermoplastic resin composition according to the present invention preferably includes a dye (D) in consideration of the effect of color forming property.

Examples of the dye (D) used in the present invention include, but are not limited to, organic dyes, such as a methine synthetic dye, an anthraquinone synthetic dye, a perinone synthetic dye, an azo synthetic dye, and a quinoline synthetic dye.

The above dyes may be used alone or in a mixture of two or more.

It is particularly preferable to use two or more of the above dyes in a mixture to form black, in order to produce a markedly high property of forming jet black.

Specific examples of the methine synthetic dye include the methine synthetic dyes commercially available as C.I. Solvent Orange 80, C.I. Solvent Orange 107, and C.I. Solvent Yellow 93.

Specific examples of the anthraquinone synthetic dye include the anthraquinone synthetic dyes commercially available as C.I. Solvent Blue 35, C.I. Solvent Green 3, C.I. Solvent Orange 28, C.I. Solvent Red 111, C.I. Solvent Red 168, C.I. Solvent Red 207, C.I. Disperse Red 22, C.I. Solvent Red 52, C.I. Disperse Red 60, C.I. Disperse Violet 31, C.I. Solvent Blue 36, C.I. Solvent Blue 83, C.I. Solvent Blue 97, C.I. Solvent Blue 78, C.I. Solvent Blue 94, C.I. Solvent Blue 63, C.I. Solvent Blue 87, C.I. Solvent Red 149, C.I. Solvent GREEN 28, C.I. Solvent Red 151, C.I. Solvent Red 150, etc.

Specific examples of the perinone synthetic dye include the perinone synthetic dyes commercially available as C.I. Solvent Orange 60, C.I. Solvent Red 135, and C.I. Solvent Red 179.

Specific examples of the azo synthetic dye include the azo synthetic dyes commercially available as C.I. Solvent Yellow 14, C.I. Solvent Yellow 16, C.I. Solvent Red 23, C.I. Solvent Red 24, and C.I. Solvent Red 27.

Specific examples of the quinoline synthetic dye include the quinoline synthetic dyes commercially available as C.I. Solvent Yellow 33, C.I. Solvent Yellow 157, C.I. Disperse Yellow 54, and C.I. Disperse Yellow 160.

Although each of the above synthetic dyes is not black alone, using plural types of synthetic dyes having different color tones in a combined manner forms black. The combination of the plural types of synthetic dyes and the mass ratio of the synthetic dyes are determined appropriately in accordance with the color tones of the synthetic dyes such that the mixture of the synthetic dyes forms black.

Examples of the combination of color tones include, but are not limited to, the combination of orange, green, and red. For example, a black organic dye can be prepared by mixing Solvent Orange 107, Solvent Green 3, and Solvent Red 52 at a mass ratio of Solvent Orange 107:Solvent Green 3:Solvent Red 52=1:1:1.

Thermoplastic Resin Composition

The thermoplastic resin composition according to the present invention includes the above-described graft copolymer (B) according to the present invention and the above copolymer (C) and preferably further includes the above dye (D).

The content of the graft polymer (B) according to the present invention in the thermoplastic resin composition according to the present invention is preferably 10% to 50% by mass relative to 100% by mass of the total content of the graft copolymer (B) and the copolymer (C). The content of the copolymer (C) is preferably 50% to 90% by mass. When the contents of the graft polymer (B) and the copolymer (C) fall within the above ranges, the thermoplastic resin composition according to the present invention and a molded article produced by molding the thermoplastic resin composition may have excellent transparency, that is, excellent color forming property, and excellent impact resistance.

In the case where the thermoplastic resin composition according to the present invention includes the dye (D), the content of the dye (D) is preferably, but not limited, 0.1 to 3 parts by mass and is more preferably 0.1 to 2.5 parts by mass relative to 100 parts by mass of the total amount of the graft copolymer (B) according to the present invention and copolymer (C). When the content of the dye (D) falls within the above range, the balance between the impact resistance, weather resistance, and color forming property of the resulting molded article is enhanced.

The thermoplastic resin composition according to the present invention may optionally include another thermoplastic resin as needed such that the physical properties of the thermoplastic resin composition and a molded article produced by molding the thermoplastic resin composition are not impaired. Examples of the other thermoplastic resin include, but are not limited to, a polycarbonate resin, polybutylene terephthalate (PBT resin), polyethylene terephthalate (PET resin), polyvinyl chloride, polystyrene, a polyacetal resin, modified polyphenylene ether (modified PPE resin), an ethylene-vinyl acetate copolymer, polyarylate, a liquid-crystal polyester resin, a polyethylene resin, a polypropylene resin, a fluororesin, and a polyamide resin (nylon). The above thermoplastic resins may be used alone or in a mixture of two or more.

In the production (mixing) or molding of the thermoplastic resin composition, other common additives, such as a lubricant, a pigment, a filler (e.g., carbon black, silica, or titanium oxide), a heat-resisting agent, an oxidation degradation inhibitor, a weather-resistant agent, a release agent, a plasticizer, and an antistatic agent, may be optionally added to the thermoplastic resin composition according to the present invention, such that the physical properties of the thermoplastic resin composition and a molded article produced by molding the thermoplastic resin composition are not impaired.

The thermoplastic resin composition according to the present invention may be produced by a known method with a known apparatus. One of the common production methods is melt mixing. Examples of the apparatus used in this method include an extruder, a Banbury mixer, a roller, and a kneader. The mixing process may be performed in either batch or continuous mode.

The order in which the above components are mixed with one another is not limited; the above components may be mixed in any order as long as the all the components are mixed with one another uniformly.

Molded Article

The molded article according to the present invention is produced by molding the thermoplastic resin composition according to the present invention.

Examples of the molding method of the thermoplastic resin composition according to the present invention include injection molding, an injection compression molding machine method, an extrusion method, blow molding, vacuum molding, compressed-air molding, calender molding, and inflation molding. Among these, injection molding and injection compression molding are preferable in order to achieve excellent mass productivity and produce a molded article having high dimension accuracy.

Applications

The molded article according to the present invention, which is produced by molding the thermoplastic resin composition according to the present invention, is excellent in terms of color forming property, impact resistance, and weather resistance.

The applications of the thermoplastic resin composition according to the present invention and the molded article produced by molding the thermoplastic resin composition are not limited. The thermoplastic resin composition according to the present invention and the molded article produced by molding the thermoplastic resin composition, which are excellent in terms of color forming property, impact resistance, and weather resistance, may be used in a variety of fields, such as OA and household electric appliance, vehicle and shipping, housing-related fields, such as furniture and building materials, sanitary goods, sundries, stationery, toys, and sporting goods. In particular, since excellent weather resistance can be achieved in the case where the thermoplastic resin composition includes a black dye, that is, excellent weather-resistant jet black forming property can be achieved, products excellent in terms of graphical design function, quality appearance, and durability can be provided in the production of vehicle interior and exterior parts, that is, in particular, vehicle exterior parts, such as door mirrors, pillars, garnishes, molding, fenders, bumpers, front grilles, and cowls.

EXAMPLES

The present invention is described below further specifically with reference to Examples and Comparative examples below. The present invention is not limited to Examples below without departing from the scope of the present invention.

Hereinafter, the expression "part" means "part by mass", and the expression "%" means "% by mass".

Measurement and Evaluation Methods

The measurement and evaluation methods used in Examples and Comparative examples below are as follows.

Volume-Average Particle Sizes of Copolymer (A) and Graft Copolymer (B)

The volume-average particle sizes (X) of the copolymers (A-1) to (A-12) and the graft copolymers (B-1) to (B-11) prepared in Examples and Comparative examples were measured using Nanotrac UPA-EX150 produced by Nikkiso Co., Ltd. by dynamic light scattering.

The particle size distribution of each of the copolymers (A-1) to (A-12) was determined by the same method as described above. Specifically, the particle size that corresponded to the frequency upper limit 10% was defined as frequency upper limit 10%-volume particle size (Y), the particle size that corresponded to the frequency lower limit 10% was defined as frequency lower limit 10%-volume particle size (Z), and the ratios of the frequency upper limit 10%-volume particle size (Y) and the frequency lower limit 10%-volume particle size (Z) to the volume-average particle size (X) were calculated.

Graft Ratio of Graft Copolymer (B)

To 80 mL of acetone, 1 g of a specific one of the graft copolymers (B-1) to (B-11) was added. The resulting mixture was heated to 65° C. to 70° C. for 3 hours to reflux. The resulting suspended acetone solution was subjected to centrifugation at 14,000 rpm for 30 minutes with a centrifugal separation apparatus ("CR21E" produced by Hitachi, Ltd.) in order to separate a precipitate component (component insoluble in acetone) and an acetone solution (component soluble in acetone) from each other. The precipitate component (component insoluble in acetone) was dried, and the mass (Q(g)) of the dried precipitate component was measured. The graft ratio was calculated using Formula (3) below. In Formula (3), Q is the mass (g) of the component of the graft copolymer (B) which was insoluble in acetone; W is the total mass (g) of the specific one of the graft copolymers (B-1) to (B-11) used in the measurement of Q; and the rubber proportion is the concentration of the solid component in the aqueous dispersion of the copolymer (A) which was used in the production of the specific one of the graft copolymers (B-1) to (B-11).

$$\text{Graft Ratio (mass\%)} = \{(Q - W \times \text{Rubber proportion})/ W \times \text{Rubber proportion}\} \times 100 \quad (3)$$

Mass-Average Molecular Weight of Copolymer (C)

The mass-average molecular weight of the copolymer (C-1) was measured by gel permeation chromatography (GPC) using a sample prepared by dissolving the copolymer (C-1) in tetrahydrofuran (THF) in terms of polystyrene (PS) standards.

Production of Copolymers (A)

Production of Copolymer (A-1)

A copolymer (A-1) having the following formulation was prepared.

Formulation n-Butyl acrylate (a): 45 parts
2-Phenoxyethyl acrylate (b): 15 parts
Allyl methacrylate: 0.24 parts
1,3-Butylene glycol dimethacrylate: 0.12 parts
Liquid paraffin: 0.6 parts
Dipotassium alkenylsuccinate: 0.05 parts
Dilauroyl peroxide: 0.6 parts
Ion-exchange water: 406 parts Into a reaction container equipped with a reagent injection container, a cooling tube, a jacketed heater, and a stirring device, n-butyl acrylate, 2-phenoxyethyl acrylate, liquid paraffin, allyl methacrylate, dilauroyl peroxide, ion-exchange water, and dipotassium alkenylsuccinate were charged. Subsequently, an ultrasound treatment was performed with ULTRASONIC HOMOGENIZER US-600 produced by Nihonseiki Kaisha Ltd. at an amplitude of 35 μm for 20 minutes at normal temperature to prepare a pre-emulsion.

The pre-emulsion was heated to 60° C. to initiate radical polymerization. As a result of the polymerization reaction, the liquid temperature was increased to 78° C. The temperature was maintained at 75° C. for 30 minutes to complete the polymerization reaction. Hereby, an aqueous dispersion of a copolymer (A-1) was prepared. Table 1 lists the volume-average particle size (X), frequency upper limit 10%-volume particle size (Y), frequency lower limit 10%-volume particle size (Z), Y/Z, and Z/Y of the copolymer (A-1).

Preparation of Copolymers (A-2) to (A-10) and (A-12)

Aqueous dispersions of copolymers (A-2) to (A-10) and (A-12) were prepared as in the preparation of the copolymer (A-1), except that the amounts of the alkyl (meth)acrylate ester (a), the (meth)acrylate ester (b) including an aromatic hydrocarbon group, and the dipotassium alkenylsuccinate were changed as described in Table 1. Table 1 lists the volume-average particle size (X), frequency upper limit 10%-volume particle size (Y), frequency lower limit 10%-volume particle size (Z), Y/Z, and Z/Y of each of the copolymers (A-2) to (A-10) and (A-12).

Preparation of Copolymer (A-11)

Into a stainless steel autoclave (hereinafter, referred to simply as "SUS autoclave"), 145 parts of ion-exchange water (hereinafter, referred to simply as "water"), 1.0 parts of potassium rosinate, 1.0 parts of potassium oleate, 0.06 parts of sodium hydroxide, 0.4 parts of sodium sulfate, and 0.3 parts of t-dodecyl mercaptan were charged. After nitrogen purging had been performed, 125 parts of 1,3-butadiene was charged into the autoclave. Then, the temperature was increased to 60° C.

Subsequently, an aqueous solution prepared by dissolving 0.3 parts of potassium persulfate in 5 parts of water was pressure-injected into the autoclave to initiate polymerization. In the polymerization reaction, the polymerization temperature was adjusted to be 65° C. After a lapse of 12 hours, the unreacted portion of 1,3-butadiene was collected when the internal pressure reached 4.5 kg/cm² (gage pressure). Subsequently, the internal temperature was changed to 80° C. and then holding was performed for 1 hour. Hereby, a butadiene rubber latex was prepared.

Into a 5-liter glass reaction container, 20 parts of the butadiene rubber latex was charged in terms of solid content. Subsequently, 1.0 parts of dipotassium alkenylsuccinate and 150 parts of water were added to the container, which was then purged with nitrogen. Subsequently, the internal temperature was increased to 70° C. To the container, an aqueous solution prepared by dissolving 0.12 parts of potassium persulfate in 10 parts of water was added. Subsequently, a monomer mixture including 79.5 parts of n-butyl acrylate (a), 0.33 parts of allyl methacrylate, and 0.17 parts of 1,3-butylene glycol dimethacrylate, which had been purged with nitrogen, was continuously added dropwise to the container over 2 hours. After the completion of the addition of the monomer mixture, the internal temperature was increased to 80° C. and holding was performed for 1 hour. Hereby, an aqueous dispersion of a copolymer (A-11) constituted by a butadiene rubber and an acrylic rubber was prepared. Table 1 lists the volume-average particle size (X), frequency upper limit 10%-volume particle size (Y), frequency lower limit 10%-volume particle size (Z), Y/X, and Z/X of the copolymers (A-11).

TABLE 1

| Copolymer (A) | | A-1 | A-2 | A-3 | A-4 | A-5 | A-6 | A-7 | A-8 | A-9 | A-10 | A-11 | A-12 |
|---|---|---|---|---|---|---|---|---|---|---|---|---|---|
| Contents of raw materials (part) | n-Butyl acrylate (a) | 45 | 45 | 45 | 50 | 40 | 45 | 45 | 45 | 55 | 60 | 45 | 50 |
| | 2-Phenoxyethyl acrylate (b) | 15 | 15 | 15 | 10 | 20 | 15 | 15 | 15 | 5 | | | |
| | Butadiene rubber | | | | | | | | | | | 15 | |
| | Methyl methacrylate | | | | | | | | | | | | 50 |
| | Dipotassium alkenylsuccinate | 0.05 | 0.02 | 0.1 | 0.05 | 0.05 | 0.7 | 0.1 | 0.05 | 0.05 | 0.05 | 0.2 | 5 |
| Volume-average particle size (X) (nm) | | 400 | 550 | 300 | 400 | 400 | 100 | 180 | 400 | 400 | 400 | 300 | 100 |
| Frequency upper limit 10%-volume particle size (Y) (nm) | | 490 | 645 | 390 | 485 | 490 | 135 | 240 | 650 | 490 | 485 | 445 | 140 |
| Y/X | | 1.23 | 1.17 | 1.30 | 1.21 | 1.23 | 1.35 | 1.33 | 1.63 | 1.23 | 1.21 | 1.48 | 1.40 |
| Frequency lower limit 10%-volume particle size Z (nm) | | 305 | 460 | 240 | 300 | 300 | 70 | 140 | 180 | 310 | 310 | 150 | 60 |
| Z/X | | 0.76 | 0.84 | 0.80 | 0.75 | 0.75 | 0.70 | 0.78 | 0.45 | 0.78 | 0.78 | 0.50 | 0.60 |
| Remark | | For Examples | | | | | | | | For Comparative examples | | | |

Preparation of Graft Copolymers (B)

Preparation of Graft Copolymer (B-1)

After the preparation of the copolymer (A-1), while the internal temperature of the reaction container was maintained to be 75° C., relative to 60 parts (in terms of solid content) of the copolymer (A-1), an aqueous solution containing 0.001 parts of ferrous sulfate, 0.003 parts of a disodium ethylenediaminetetraacetate salt, 0.3 parts of Rongalite, and 5 parts of ion-exchange water was added to the container. Subsequently, an aqueous solution containing 0.65 parts of dipotassium alkenylsuccinate and 10 parts of ion-exchange water was added to the container. Subsequently, a mixture of 8 parts of methyl methacrylate, 8 parts of acrylonitrile, and 24 parts of styrene, which was used as a vinyl monomer mixture (m1), and 0.18 parts of t-butyl hydroperoxide were added dropwise to the container over 1 hour 30 minutes to cause graft polymerization.

After the completion of the addition of the mixture, the internal temperature was maintained to be 75° C. for 10 minutes. Subsequently, cooling was performed. When the internal temperature reached 60° C., an aqueous solution prepared by dissolving 0.2 parts of an antioxidant (AN-TAGE W500 produced by Yoshitomi Pharmaceutical Industries, Ltd.) and 0.2 parts of dipotassium alkenylsuccinate in 5 parts of ion-exchange water was added to the container. The aqueous dispersion obtained as a reaction product was solidified using an aqueous sulfuric acid solution, cleaned with water, and then dried. Hereby, a graft copolymer (B-1)

was prepared. The graft copolymer (B-1) had a graft ratio of 25% and a volume-average particle size of 510 nm.

Preparation of Graft Copolymers (B-2) to (B-11)

Graft copolymers (B-2) to (B-11) were prepared as in the preparation of the graft copolymer (B-1), except that the type of the copolymer (A) used was changed as described in Table 2.

Table 2 lists the graft ratio and volume-average particle size of each of the graft copolymers (B-2) to (B-11).

Methods for Measuring and Evaluating Thermoplastic Resin Composition

Measurement of Melt Volume Rate (MVR)

The MVR of the thermoplastic resin composition at 220° C. was measured with a load of 98 N (10 kg) in accordance with ISO 1133:1997. MVR is a measure of the flowability of the thermoplastic resin composition. The higher the MVR value, the higher the degree of flowability.

TABLE 2

| Graft copolymer (B) | | B-1 | B-2 | B-3 | B-4 | B-5 | B-6 | B-7 | B-8 | B-9 | B-10 | B-11 |
|---|---|---|---|---|---|---|---|---|---|---|---|---|
| Copolymer (A) | A-1 | 60 | | | | | | | | | | |
| (part) | A-2 | | 60 | | | | | | | | | |
| | A-3 | | | 60 | | | | | | | | |
| | A-4 | | | | 60 | | | | | | | |
| | A-5 | | | | | 60 | | | | | | |
| | A-6 | | | | | | 60 | | | | | |
| | A-7 | | | | | | | 60 | | | | |
| | A-8 | | | | | | | | 60 | | | |
| | A-9 | | | | | | | | | 60 | | |
| | A-10 | | | | | | | | | | 60 | |
| | A-11 | | | | | | | | | | | 60 |
| Vinyl monomer mixture (m1) (part) | Methyl methacrylate | 8 | 8 | 8 | 8 | 8 | 8 | 8 | 8 | 8 | 8 | 8 |
| | Acrylonitrile | 8 | 8 | 8 | 8 | 8 | 8 | 8 | 8 | 8 | 8 | 8 |
| | Styrene | 24 | 24 | 24 | 24 | 24 | 24 | 24 | 24 | 24 | 24 | 24 |
| Volume-average particle size (nm) | | 510 | 660 | 400 | 500 | 515 | 120 | 250 | 500 | 500 | 420 | 500 |
| Graft ratio (%) | | 25 | 24 | 25 | 24 | 26 | 20 | 19 | 24 | 25 | 24 | 26 |

Production of Copolymer (C)

Production of Copolymer (C-1)

Into a pressure-resistant reaction container, 150 parts of ion-exchange water, a mixture of 99 parts of methyl methacrylate and 1 part of methyl acrylate, which was used as a vinyl monomer mixture (m2), 0.2 parts of 2,2'-azobis(isobutyronitrile), 0.45 parts of n-octyl mercaptan, 0.47 parts of calcium hydroxyapatite, and 0.003 parts of potassium alkenyl succinate were charged. Then, the internal temperature was increased to 75° C., and a reaction was conducted for 3 hours. Subsequently, the temperature was increased to 90° C., and holding was performed for 60 minutes to complete the reaction. The contents were repeatedly cleaned and dehydrated with a centrifugal dehydrator and then dried. Hereby, a copolymer (C-1) having a mass-average molecular weight of 124,000 was prepared.

Examples 1 to 9 and Comparative Examples 1 to 9

The components were mixed with each other in the amounts (mass parts) described in Tables 3A and 3B. To the resulting mixture, "NUBIAN PC-5856" produced by Orient Chemical Industries Co., Ltd. was added as a dye (D) in the specific amount described in Table 3A or 3B. The mixture was then melt-kneaded at 240° C. with a twin-screw extruder ("PCM30" produced by Ikegai Corp) having a vacuum vent with a diameter of 30 mm to form a pellet-like thermoplastic resin composition.

The melt volume rate of the thermoplastic resin composition was determined by the method described below.

The impact resistance, color forming property, and weather resistance of a molded article prepared by injection-molding of the thermoplastic resin composition were evaluated by the methods described below.

Tables 3A and 3B list the evaluation results.

Injection Molding 1

A pellet of the thermoplastic resin composition produced by melt kneading was molded into a molded article having a length of 80 mm, a width of 10 mm, and a thickness of 4 mm using an injection molding machine ("IS55FP-1.5A" produced by Toshiba Machine Co., Ltd.) at a cylinder temperature of 200° C. to 270° C. and a mold temperature of 60° C. This molded article was used as a molded article for Charpy impact test (molded article (Ma1)).

Injection Molding 2

A pellet of the thermoplastic resin composition produced by melt kneading was molded into a molded article having a length of 100 mm, a width of 100 mm, and a thickness of 3 mm using an injection molding machine ("IS55FP-1.5A" produced by Toshiba Machine Co., Ltd.) at a cylinder temperature of 200° C. to 270° C. and a mold temperature of 60° C. This molded article was used as a molded article for color forming property and weather resistance evaluation (molded article (Ma2)).

Impact Resistance Evaluation: Charpy Impact Test

The Charpy impact strength (impact direction: edgewise) of the molded article (Ma1) (Type B1, with notch: Shape A single notch) was measured in accordance with ISO 179-1: 2013 at a test temperature of 23° C. The higher the Charpy impact strength, the higher the degree of impact resistance.

Evaluation of Color Forming Property

The lightness L* of each of the molded articles (Ma2) was measured using a spectrophotometer ("CM-3500d" produced by Konica Minolta Optics, Inc.) in the SCE mode. The L* value was considered "L*(ma)". The smaller the L* value, the higher the degree of blackness and the higher the evaluation grade given in terms of color forming property.

The term "lightness L*" used herein refers to the lightness value (L*) of the color values used in the L*a*b* colorimetric system employed in JIS Z 8729.

The "SCE mode" is a method in which colorimetry is performed using a spectrophotometer conforming to JIS Z 8722 by removing any specular reflected light with a light trap.

Weather Resistance Evaluation

Each of the molded articles (Ma2) was treated with Sunshine Weather Meter (produced by Suga Test Instruments Co., Ltd.) at a black panel temperature of 63° C. under a cycle condition of 60 minutes (rainfall: 12 minutes) for 1500 hours. The lightness L* and hue values a* and b* were measured as in the evaluation of the color forming property, before and after the above treatment was performed, and the change ΔE (ΔL*+Δa*+Δb*) was calculated and evaluated in accordance with the following standards.

◯: ΔE* was 3 or less: excellent weather resistance
Δ: ΔE* was more than 3 and 5 or less: slightly poor weather resistance
X: ΔE* was more than 5: poor weather resistance

TABLE 3A

| | | | Example 1 | Example 2 | Example 3 | Example 4 | Example 5 | Example 6 | Example 7 | Example 8 | Example 9 |
|---|---|---|---|---|---|---|---|---|---|---|---|
| Formulation of thermoplastic resin composition (part) | Graft copolymer (B)* | B-1 (510 nm) | 22 | 15 | | | | | 29 | 8 | 35 |
| | | B-2 (660 nm) | | | 22 | | | | | | |
| | | B-3 (400 nm) | | | | 22 | | | | | |
| | | B-4 (500 nm) | | | | | 22 | | | | |
| | | B-5 (515 nm) | | | | | | 22 | | | |
| | | B-6 (120 nm) | 15 | 22 | 15 | 15 | 15 | 15 | 8 | 29 | |
| | | B-7 (250 nm) | | | | | | | | | |
| | | B-8 (500 nm) | | | | | | | | | |
| | | B-9 (500 nm) | | | | | | | | | |
| | | B-10 (420 nm) | | | | | | | | | |
| | | B-11 (500 nm) | | | | | | | | | |
| | Copolymer (A) | A-12 | | | | | | | | | |
| | Copolymer (C) | C-1 | 63 | 63 | 63 | 63 | 63 | 63 | 63 | 63 | 65 |
| | Dye (D) | PC-5856 | 1 | 1 | 1 | 1 | 1 | 1 | 1 | 1 | 1 |
| 220° C. MVR (cm³/10 min) | | | 5.6 | 5.5 | 5.4 | 5.7 | 5.6 | 5.8 | 5.4 | 5.5 | 5.6 |
| Impact resistance (kJ/m²) | | | 9.1 | 8.8 | 8.9 | 9.2 | 8.5 | 9 | 8.3 | 8.2 | 7.5 |
| Color forming property (L*) | | | 1.1 | 1.2 | 1.2 | 1.2 | 1.2 | 1.3 | 1.2 | 1.3 | 1.2 |
| Weather resistance | | | ◯ | ◯ | ◯ | ◯ | ◯ | ◯ | ◯ | ◯ | ◯ |

*Values in parentheses are volume-average particle sizes

TABLE 3B

| | | | Comparative example 1 | Comparative example 2 | Comparative example 3 | Comparative example 4 | Comparative example 5 | Comparative example 6 | Comparative example 7 | Comparative example 8 | Comparative example 9 |
|---|---|---|---|---|---|---|---|---|---|---|---|
| Formulation of thermoplastic resin composition (part) | Graft copolymer (B)* | B-1 (510 nm) | | | | | | | | | |
| | | B-2 (660 nm) | | | | | | | | | |
| | | B-3 (400 nm) | | | | | | | | | |
| | | B-4 (500 nm) | | | | | | | | | |
| | | B-5 (515 nm) | | | | | | | | | |
| | | B-6 (120 nm) | 35 | 15 | 22 | 15 | 15 | 22 | 15 | 15 | |
| | | B-7 (250 nm) | | 22 | | | | | | | |
| | | B-8 (500 nm) | | | 15 | 22 | | | | | |
| | | B-9 (500 nm) | | | | | 22 | 15 | | | |
| | | B-10 (420 nm) | | | | | | | 22 | | |
| | | B-11 (500 nm) | | | | | | | | 22 | |
| | Copolymer (A) | A-12 | | | | | | | | | 100 |
| | Copolymer (C) | C-1 | 65 | 63 | 63 | 63 | 63 | 63 | 63 | 63 | |
| | Dye (D) | PC-5856 | 1 | 1 | 1 | 1 | 1 | 1 | 1 | 1 | 1 |
| 220° C. MVR (cm³/10 min) | | | 5.3 | 5.4 | 5.5 | 5.5 | 5.6 | 5.3 | 5.5 | 5.4 | 3 |
| Impact resistance (kJ/m²) | | | 5 | 5 | 6 | 6 | 8 | 7.8 | 7 | 6 | 3 |
| Color forming property (L*) | | | 1.4 | 1.3 | 1.3 | 1.4 | 1.3 | 1.2 | 1.2 | 1.2 | 0.8 |
| Weather resistance | | | Δ | Δ | ◯ | ◯ | X | X | X | X | ◯ |

*Values in parentheses are volume-average particle sizes

The results listed in Tables 3A and 3B confirm the following facts.

In Comparative examples 1 and 2, where only a graft copolymer (B) having a small volume-average particle size was used, impact resistance and weather resistance were poor. In Comparative example 1, color forming property was also poor.

Since the copolymer (A-8) used for preparing the graft copolymer (B-8) having a volume-average particle size of 500 nm, which was used in Comparative examples 3 and 4, did not have the particle size distribution specified in the present invention, impact resistance was poor in Comparative examples 3 and 4. In Comparative example 4, color forming property was also poor.

Since the compounding ratio between the n-butyl acrylate (a) and 2-phenoxyethyl acrylate (b) in the copolymer (A-9) used for preparing the graft copolymer (B-9) having a volume-average particle size of 500 nm, which was used in Comparative examples 5 and 6, was outside of the scope of the present invention, impact resistance and weather resistance were poor in Comparative examples 5 and 6.

Since the copolymer (A-10) used for producing the graft copolymer (B-10) having a volume-average particle size of 420 nm, which was used in Comparative example 7, was prepared without using 2-phenoxyethyl acrylate (b) but using only n-butyl acrylate (a), impact resistance and weather resistance were poor in Comparative example 7.

Since the copolymer (A-11) used for producing the graft copolymer (B-11) having a volume-average particle size of 50 nm, which was used in Comparative example 8, was prepared using butadiene rubber instead of 2-phenoxyethyl acrylate (b), impact resistance and weather resistance were poor in Comparative example 8.

In Comparative example 9, where a graft copolymer was not used and only the copolymer (A-12) was used, impact resistance was significantly poor.

In contrast, in Examples 1 to 9, which satisfied the conditions specified in the present invention, impact resistance, color forming property, and weather resistance were all excellent.

In Example 9, where only one type of graft copolymer (B-1) was used, impact resistance was slightly poor compared with Examples 1 to 8, where two types of graft copolymers (B) having different particle sizes were used in combination, but was still in the range acceptable in practical applications. In Example 9, color forming property and weather resistance were good.

Although the present invention has been described in detail with reference to particular embodiments, it is apparent to a person skilled in the art that various modifications can be made therein without departing from the spirit and scope of the present invention.

The present application is based on Japanese Patent Applications No. 2020-140254 filed on Aug. 21, 2020, which are incorporated herein by reference in their entirety.

The invention claimed is:

1. A thermoplastic resin composition comprising:
a graft copolymer (B) produced by graft polymerization of a vinyl monomer mixture (m1) including an alkyl (meth)acrylate ester, a vinyl cyanide compound, and an aromatic vinyl compound onto a copolymer (A), the copolymer (A) being a copolymer of an alkyl (meth)acrylate ester (a) and a (meth)acrylate ester (b) including an aromatic hydrocarbon group; and
a copolymer (C) that is a product of a polymerization reaction of a vinyl monomer mixture (m2) including an alkyl (meth)acrylate ester,
wherein the graft copolymer (B) includes at least a graft copolymer (B) having a volume-average particle size of 300 to 800 nm,
wherein, relative to 100% by mass of a total content of a unit of the alkyl (meth)acrylate ester (a) and a unit of the (meth)acrylate ester (b) including an aromatic hydrocarbon group in the copolymer (A), a content of the unit of the alkyl (meth)acrylate ester (a) in the copolymer (A) is 67% to 83% by mass and a content of the unit of the (meth)acrylate ester (b) including an aromatic hydrocarbon group in the copolymer (A) is 17% to 33% by mass,
wherein the copolymer (A) has a volume-average particle size (X) of 50 to 800 nm, and
wherein the volume-average particle size (X), a frequency upper limit 10%-volume particle size (Y), and a frequency lower limit 10%-volume particle size (Z) satisfy (1) and (2) below:
(1) $Y/X \leq 1.4$
(2) $Z/X \geq 0.6$
where X represents the volume-average particle size (X) of the copolymer (A), Y represents the frequency upper limit 10%-volume particle size (Y) that is a particle size of the copolymer (A) at which a cumulative frequency calculated from an upper limit of a particle size distribution curve of the copolymer (A) reaches 10%, and Z represents the frequency lower limit 10%-volume particle size (Z) that is a particle size of the copolymer (A) at which a cumulative frequency calculated from a lower limit of the particle size distribution curve of the copolymer (A) reaches 10%.

2. The thermoplastic resin composition according to claim 1, wherein, relative to 100 parts by mass of a total content of the graft copolymer (B) and the copolymer (C), a content of the graft copolymer (B) is 10 to 50 parts by mass and a content of the copolymer (C) is 50 to 90 parts by mass.

3. The thermoplastic resin composition according to claim 1, wherein a content of the alkyl (meth)acrylate ester in the vinyl monomer mixture (m1) is 10% to 30% by mass, a content of the vinyl cyanide compound in the vinyl monomer mixture (m1) is 10% to 30% by mass, and a content of the aromatic vinyl compound in the vinyl monomer mixture (m1) is 50% to 70% by mass.

4. The thermoplastic resin composition according to claim 1, wherein, relative to 100% by mass of a total content of the copolymer (A) and the vinyl monomer mixture (m1) in the graft copolymer (B), a proportion of the copolymer (A) is 50% to 80% by mass and a proportion of the vinyl monomer mixture (m1) is 20% to 50% by mass.

5. The thermoplastic resin composition according to claim 1, further comprising a dye (D).

6. A molded article produced by molding the thermoplastic resin composition according to claim 1.

* * * * *